United States Patent Office 3,540,071
Patented Nov. 17, 1970

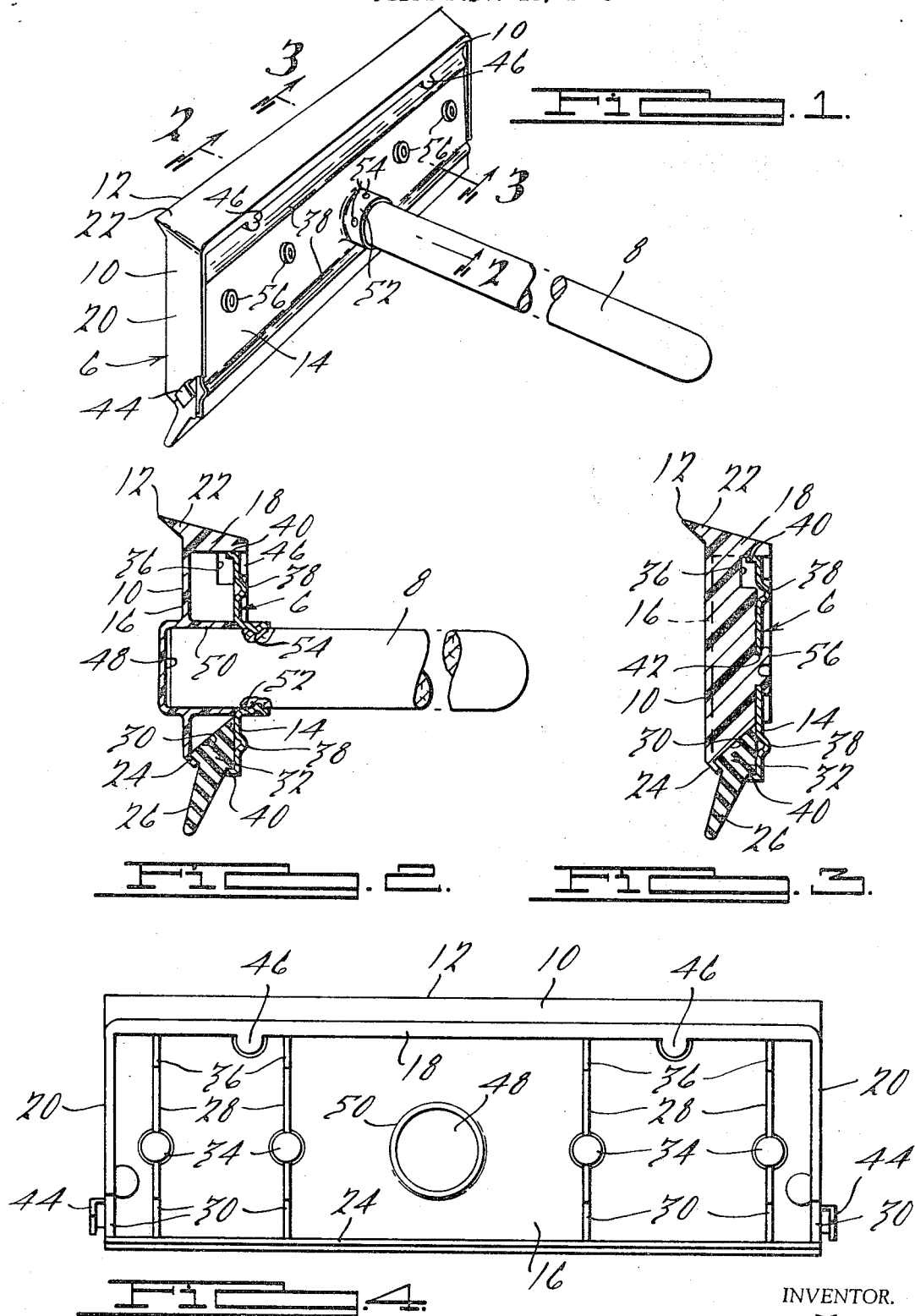

3,540,071
CLEANING TOOL
Irving W. Jorgensen, 800 River Bend Drive,
Owosso, Mich. 48867
Continuation-in-part of application Ser. No. 686,857,
Nov. 30, 1967. This application Sept. 18, 1968,
Ser. No. 760,591
Int. Cl. A47l 1/06; B60s 1/02
U.S. Cl. 15—105                                     11 Claims

ABSTRACT OF THE DISCLOSURE

A cleaning tool adapted to incorporate a scraping member and/or a squeegee member along at least one edge of frame to which a handle is secured wherein the frame is comprised of a two-piece construction formed with an aligned recess in one frame member and a tubular projection in the other frame member for receiving and securing the handle to the frame.

CROSS-REFERENCE TO RELATED APPLICATIONS

The present application is a continuation-in-part of prior copending application Ser. No. 686,857 filed Nov. 30, 1967 for "Cleaning Tool" and now abandoned.

BACKGROUND OF THE INVENTION

Various cleaning tools of the general type to which the present invention is applicable have heretofore been used or proposed for use for removing snow and ice from automobile and residential windows and the like. Conventionally, cleaning tools of this general type are formed with a scraping member along one edge which is of a substantially rigid structure having a scraping edge therealong for dislodging particles such as ice adhered to the surface being cleaned. A resilient wiping or squeegee member is usually affixed to the opposite edge to provide a wiping action for removal of any residuary liquid on the surface being cleaned.

Cleaning tools of the types heretofore known, have been deficient in one or more respects and particularly in regard to their durability and retention of the scraping and wiping members in appropriate position. The shock loading imposed on the scaping members such as during removal of ice from automobile windshields and the like, has generally occasioned a progressive deformation of the framework on which the scaping member is mounted effecting a loosening thereof and an eventual disengagement of the scraping member. In order to overcome this problem, some of the constructions of the type heretofore known, have employed relatively cumbersome metallic frames for supporting the scraping member which have caused damage in some instances to the surface being cleaned and surrounding surfaces as a result of gouging or scratching such surfaces during the manipulation of the tool. Additionally, such constructions heretofore known have been relatively expensive to fabricate and assemble.

A further problem associated with cleaning tools of the type heretofore known has been the tendency of a skewing of the scraping head relative to the handle due to the non-uniform loads imposed along the length of the scraper edge during the use of the tool. The skewing or bending of the scraper head has contributed not only to an increased difficulty in manipulating the tool but has also contributed toward a significant reduction in the useful operating life thereof.

The cleaning tool comprising the present invention overcomes the aforementioned and other problems and disadvantages by providing a substantially simple and flexible framework which provides for an improved mounting of the tool handle and which structure is of simple and durable construction and of economical manufacture.

SUMMARY OF THE INVENTION

The foregoing and other benefits and advantages of the present invention are achieved by a cleaning tool comprising a framework having a cleaning member along at least one edge thereof and a handle secured to the framework for manipulating the cleaning tool. The framework is of a composite construction consisting of a first frame member and a second frame member disposed in overlying secured relationship and wherein one member is formed with a recess and the other frame member is formed with a tubular projection which is disposed in axial alignment with and projecting in a direction opposite to the recess. The handle is disposed within the tubular projection and is positioned with its end portion in seated engagement in the recess. Suitable securing means are provided for securing a handle in position forming a rigid connection between the handle and the cleaning tool framework.

In accordance with a preferred embodiment of the present invention, one of the frame members is composed of a substantially rigid abrasion resistant plastic and is integrally formed along one side thereof with a scraping edge. The other frame member is composed of a high strength material such as sheet metal and the sides of the frame members opposite to the scraping edge are formed so as to define a longitudinally extending cavity for engageably receiving a resilient wiping member.

Additional advantages and benefits of the present invention will become apparent upon a reading of the description of the preferred embodiment taken in conjunction with the accompanying drawing.

DESCRIPTION OF THE DRAWING

FIG. 1 is a perspective view of a cleaning tool constructed in accordance with the preferred embodiments of the present invention.

FIG. 2 is a transverse vertical sectional view through the framework of the cleaning tool at substantially the center thereof as shown in FIG. 1 and taken substantially along the line 2—2 thereof;

FIG. 3 is a transverse sectional view of the cleaning tool shown in FIG. 1 and taken substantially along the line 3—3 thereof; and FIG. 4 is an elevational view of one of the frame members of the cleaning tool framework.

DESCRIPTION OF THE PREFERRED EMBODIMENTS

A cleaning tool constructed in accordance with the preferred embodiments of the present invention and as illustrated in FIG. 1, is comprised of a composite framework 6 to which an elongated handle 8 is secured at substantially the midpoint thereof. The framework 6 is of a composite construction comprising a first frame member 10 which is integrally formed with a scraping edge 12 along one side thereof and a second frame member or backing plate 14 which is disposed in substantially co-extensive overlying relationship against the first frame member 10.

The first frame member 10 as shown in the drawing and as best illustrated in FIG. 4, is preferably composed of an integral substantially rigid synthetic plastic material which is resistant to abrasion and shock such that the scraping edge 12 thereof will not scratch or otherwise mar glass surfaces to which it is applied. The first frame member 10 comprises a substantially planar rectangular base plate 16 having a side wall 18 and a pair of end walls 20 integrally affixed to the side and end edges thereof. The scraping edge 12 is defined by a V-shaped extension 22 of the side wall 18 projecting beyond the outer face of the base plate 16. The side edge of the base plate opposite to the side wall 18 is formed with an angular lip 24 extending along substantially the entire length thereof which is adapted to be disposed in overlying engagement with a shoulder formed on a resilient squeegee member 26.

A plurality of transversely extending integral ribs 28 are affixed to and project upwardly of the inner surface of the base plate 16 and extend between the side wall 18 to a point adjacent to the angular lip 24. The edges of the ribs 28 as well as the edges of the end walls 20 disposed adjacent to the angular lip are chamfered as at 30 so as to provide a seat against which the inner triangular portion 32 of the squeegee member 26 is seated. A stud or pin 34 is integrally formed centrally of each of the ribs 28 and projects beyond the transverse outer edge thereof for fastening the second frame member 14 to the first frame member in a manner subsequently to be described. The outer transverse edges of the ribs 28, as best seen in FIG. 3, are also formed with a notch 36 adjacent to the side wall 18.

The second frame member is preferably composed of a high strength material such as sheet metal and is of a substantially planar rectangular configuration. The base plate is formed with a pair of longitudinally extending beads 38 effecting a further rigidification thereof and the longitudinal side edges are turned inwardly forming a pair of longitudinally extending side flanges 40. A plurality of apertures 42 are formed in the second frame member and are positioned so as to be in aligned relationship relative to the pins 34 projecting upwardly of the ribs of the first frame member 10.

The second frame member 14 when assembled with the first frame member 10 forming the composite framework, as best seen in FIGS. 2 and 3, is disposed in substantially co-extensive overlying relationship over the back surface of the first frame member and with the projecting ends of the pins 34 extending through the apertures 42 thereof. One of the side flanges 40 of the second frame member is disposed within the notches 36 of the ribs while the balance of the second frame is supported at longitudinally spaced intervals by the exterior transverse edges of the ribs. The opposite side flange 40 of the second frame member is positioned in overlying engaging relationship against the shoulder of the triangular portion 32 of the squeegee member. As will be noted in FIG. 3, the lower edge of the first and second frame members define a longitudinally extending V-shaped cavity for overlying and frictionally engaging the triangular portion 32 of the squeegee member thereby maintaining it in appropriate position along one side edge of the composite framework. In order to further restrict undesirable longitudinal movement of the squeegee member 26 relative to the framework, the first frame member 10 is preferably provided with ears or tabs 44 which are integrally affixed to the end walls 20 and project into overlying restraining relationship against the end surfaces of the squeegee member.

A further interlocking of the first frame member and second frame member is provided by a series of depending integrally formed tabs 46 which project inwardly of the side wall 18 and in overlying bearing relationship against the outer surface of the second frame member 14. It will be further observed in the drawing that the side wall 18 and end walls 20 are of a height so as to overlie one side edge and both end edges of the second frame member thereby further restricting relative movement thereof with respect to the first frame member and further shielding the side and the end edges of the second frame member from contact with the surfaces to be cleaned. This protective shielding of the side walls of the first frame member avoids any metallic contact by the second frame member with the objects and surfaces to be cleaned avoiding thereby any scratching or marring of such surfaces.

A secure attachment of the handle 8 to the framework 6 preventing a skewing therebetween during the use of the cleaning tool is achieved by a recess or pocket 48 integrally formed at substantially the center of the base plate 16 of the first frame member. The inner surface of the base plate 16 is also preferably provided with an annular integrally formed collar 50 which forms an enclosing side wall of the pocket 48. The pocket 48 is in substantial axial alignment with a tubular projection 52 integrally formed at substantially the center of the second frame member and projecting outwardly therefrom. The handle is adapted to be inserted through the tubular projection 52 and annular collar 50 with the end portion thereof disposed in seated engagement within the recess 48. The fastening of the handle in position in the framework is preferably achieved after the handle has been installed by deforming localized portions of the tubular projection 52 so as to form a plurality of engaging tangs 54 extending substantially radially inwardly at circumferentially spaced intervals which are embedded in the handle effecting a frictional engagement therewith. Alternatively, the handle can be secured such as by means of a screw extending through the end wall of the recess 48 having its shank disposed in threaded engagement in the end portion of the handle 8.

The assembly of the composite framework is simply achieved by first placing the resilient squeegee member 26 in appropriate position and in seated engagement against the chamfered edges 30 and angular lip 24 of the first frame member whereafter the second frame member is inserted under the tabs 46 and is positioned such that the ends of the pins 34 extend through and project beyond the apertures of the second member. Thereafter, the projecting end portions of the pins are swaged or offset as indicated at 56 in FIGS. 1 and 3 forming an enlarged head which overlies the second member adjacent to the periphery of the apertures maintaining the assembly in appropriate clamped relationship.

In accordance with a preferred embodiment of the present invention, the plastic of which the first frame member is composed is of a thermoplastic heat softenable type such that upon assembly of the composite framework, the projecting end portion of the pins 34 can be softened and deformed so as to form the swaged portion 56 effecting an interlocking of the two frame members. The handle thereafter is inserted through the tubular projection until it is firmly seated within the recess 48 and the tangs 54 are thereafter deformed in the tubular projection effecting a firm engagement.

While it will be apparent that the description of the preferred embodiments of the invention disclosed are well calculated to achieve the advantages and benefits as hereinabove stated, it will be appreciated that the invention is susceptible to modification, variation and change without departing from the spirit of the invention.

What is claimed is:

1. A cleaning tool comprising a framework having a cleaning member along at least one edge thereof, and a handle secured to said framework, said framework comprising of a first frame member and a second frame member disposed in overlying relationship, means for securing said first frame member and said second frame member to each other, said first frame member being formed with a socket provided with an end wall and an enclosing side wall, said second member being formed with a tubular projection in axial alignment with said socket, said handle extending through and being closely confined by said tubular projection and having its end portion closely fitted in said socket and seated against the end wall thereof, and securing means for securing said handle in a fixed position in said socket and projection.

2. The cleaning tool as defined in claim 1 wherein said socket and said tubular projection are integrally formed with said first and said second frame members, respectively.

3. The cleaning tool as defined in claim 1 wherein said securing means comprises integrally formed inwardly directed offset portions in said tubular projection disposed in embedded engagement in said handle.

4. The cleaning tool as defined in claim 1, wherein said socket, said tubular projection and said handle are of substantially circular cross section.

5. The cleaning tool as defined in claim 1, wherein said first member is formed of a substantially rigid abrasion resistant plastic and said second member is composed of sheet metal.

6. The cleaning tool as defined in claim 1, wherein said first member is composed of a substantially rigid abrasion resistant plastic and is integrally formed along one side thereof with a scraping edge.

7. The cleaning tool as defined in claim 1, in which said cleaning member comprises a resilient wiping member disposed in clamped relationship between the side edges of said first and said second member, and engaging means one one of the frame members for engaging said wiping member preventing undesired longitudinal movement thereof relative to said framework.

8. The cleaning tool as defined in claim 1, wherein said handle is made from wood, said first member is made from an abrasion resistant plastic and said second member is made from metal.

9. The cleaning tool as defined in claim 1, wherein said securing means comprises interengaging means between said tubular projection and said handle.

10. The cleaning tool as defined in claim 1, wherein said tubular projection projects in a direction away from said socket and said first member is coextensive with the major portion of said first member so as to reinforce and support said first member.

11. The cleaning tool as defined in claim 1, in which said first member is formed with a least one side wall which is adapted to overlie the adjacent side edge of said second member.

References Cited

UNITED STATES PATENTS 2,721,346   10/1955   Mora _____ 15—105

FOREIGN PATENTS 909,288   10/1962   Great Britain.
1,340,304   9/1963   France.

OTHER REFERENCES

"Plastics for Industrial Use," p. 53, John Sasso—1948, McGraw-Hill.

WALTER A. SCHEEL, Primary Examiner

L. G. MACHLIN, Assistant Examiner

UNITED STATES PATENT OFFICE
CERTIFICATE OF CORRECTION

Patent No. 3,540,071            Dated November 17, 1970

Inventor(s) Irving W. Jorgensen

It is certified that error appears in the above-identified patent and that said Letters Patent are hereby corrected as shown below:

Column 5, line 25, Claim 7, "one" (first occurrence) should be -- on

Column 6, line 12, Claim 11, "a" should be -- at --.

SIGNED AND
SEALED
FEB 2 1971

(SEAL)
Attest:

Edward M. Fletcher, Jr.
Attesting Officer

WILLIAM E. SCHUYLER, JR.
Commissioner of Patents

FORM PO-1050 (10-69)            USCOMM-DC 60376-I